United States Patent
Berkemeier et al.

(10) Patent No.: US 10,288,012 B2
(45) Date of Patent: May 14, 2019

(54) ARRANGEMENT FOR INTRODUCING WATER INTO THE INTAKE MANIFOLD OF AN INTERNAL COMBUSTION ENGINE AND CONTROL DEVICE

(71) Applicant: Ford Global Technologies, LLC, Dearborn, MI (US)

(72) Inventors: Oliver Berkemeier, Bergisch Gladbach (DE); Bernd Steiner, Bergisch Gladbach (DE); Georg Louven, Neuwied (DE); Klemens Grieser, Langenfeld (DE); Helmut Hans Ruhland, Eschweiler (DE)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/410,664

(22) Filed: Jan. 19, 2017

(65) Prior Publication Data
US 2017/0218884 A1 Aug. 3, 2017

(30) Foreign Application Priority Data

Jan. 28, 2016 (DE) .......................... 10 2016 201 276
Jan. 28, 2016 (DE) .......................... 10 2016 201 277

(51) Int. Cl.
*F02M 25/028* (2006.01)
*F02C 7/143* (2006.01)
(Continued)

(52) U.S. Cl.
CPC ............. *F02M 25/028* (2013.01); *F02C 3/30* (2013.01); *F02C 7/1435* (2013.01);
(Continued)

(58) Field of Classification Search
CPC .... F02M 25/028; F02M 26/35; F02M 19/086; F02M 25/0222; F02M 25/0227;
(Continued)

(56) References Cited

U.S. PATENT DOCUMENTS

| 2,076,606 A | 4/1937 | Winter |
| 3,139,873 A * | 7/1964 | Gardner ............. F02M 25/0225 |
| | | 123/25 E |

(Continued)

FOREIGN PATENT DOCUMENTS

| DE | 102007050511 A1 | 4/2009 |
| DE | 102011102248 A1 | 11/2012 |

(Continued)

OTHER PUBLICATIONS

Scott, Darryl, "HPA Motorsports 3.2 VR6 Performance Upgrades," WW Vortex: The Volkswagen Enthusiast Website, Mar. 9, 2007, <http://forums.vwvortex.com/showthread.php?6902241-HPA-Motorsports-3-2-VR6-Performance-Upgrades>, 4 pages.

*Primary Examiner* — Syed O Hasan
(74) *Attorney, Agent, or Firm* — Julia Voutyras; McCoy Russell LLP (57) ABSTRACT

Methods and systems are provided for introducing water into an intake manifold of an internal combustion engine. In one example, the system may include a water container, a water inlet for inputting water into the intake manifold, and a throttle valve that is arranged between an intake manifold inlet and the internal combustion engine, with the water container arranged at a higher point than the water inlet and the water inlet opening into the intake manifold downstream of the throttle valve. A switchable valve is arranged in fluidic connection with both the water container and the water inlet, with the result that it can enable or interrupt the introduction of water into the intake manifold and also create a Venturi (Continued)

effect at the water inlet, which draws water from the water container.

20 Claims, 3 Drawing Sheets

(51) Int. Cl.
    *F02C 3/30*     (2006.01)
    *F02M 26/35*     (2016.01)
    *F02M 19/08*     (2006.01)
    *F02M 25/022*     (2006.01)
    *F02M 31/20*     (2006.01)

(52) U.S. Cl.
    CPC ...... *F02M 19/086* (2013.01); *F02M 25/0222* (2013.01); *F02M 25/0227* (2013.01); *F02M 26/35* (2016.02); *F02M 31/20* (2013.01); *Y02T 10/121* (2013.01); *Y02T 10/126* (2013.01)

(58) Field of Classification Search
    CPC ............... F02M 31/20; F05B 2260/212; F05B 2270/16; F02C 3/30; F02C 7/1435
    See application file for complete search history.

(56) References Cited

U.S. PATENT DOCUMENTS

| | | | | |
|---|---|---|---|---|
| 3,911,871 A * | 10/1975 | Williams | ............... | F02M 25/00 123/25 K |
| 4,183,338 A * | 1/1980 | Lindberg | ............... | F02M 19/03 123/25 E |
| 4,279,223 A | 7/1981 | Csonka et al. | | |
| 4,448,153 A * | 5/1984 | Miller | ............... | F02M 25/028 123/198 A |
| 4,503,813 A | 3/1985 | Lindberg | | |
| 4,519,341 A * | 5/1985 | McGarr | ............... | F02M 25/00 123/1 A |
| 4,671,215 A * | 6/1987 | Waechter | ............ | F02M 35/042 123/25 A |
| 6,116,026 A | 9/2000 | Freese, V | | |
| 6,619,274 B2 | 9/2003 | Miyashita et al. | | |
| 8,286,615 B2 | 10/2012 | Dehnen et al. | | |
| 8,375,899 B2 | 2/2013 | Leone et al. | | |
| 8,820,270 B2 | 9/2014 | Snow | | |
| 2004/0103859 A1 | 6/2004 | Shetley | | |
| 2011/0138793 A1 | 6/2011 | Coletta | | |
| 2011/0168128 A1 | 7/2011 | Bradley et al. | | |
| 2011/0232598 A1 | 9/2011 | Harada et al. | | |
| 2014/0190148 A1* | 7/2014 | Ruhland | ............. | F02M 25/028 60/274 |
| 2017/0114738 A1* | 4/2017 | Hoard | ............... | F02M 26/07 |

FOREIGN PATENT DOCUMENTS

| | | |
|---|---|---|
| EP | 2657473 A2 | 10/2013 |
| JP | H06123225 A | 5/1994 |
| JP | H07305631 A | 11/1995 |
| JP | H08100661 A | 4/1996 |
| WO | 2004025108 A1 | 3/2004 |
| WO | 2009003562 A1 | 1/2009 |
| WO | 2015046182 A1 | 4/2015 |

* cited by examiner

ARRANGEMENT FOR INTRODUCING WATER INTO THE INTAKE MANIFOLD OF AN INTERNAL COMBUSTION ENGINE AND CONTROL DEVICE

CROSS-REFERENCE TO RELATED APPLICATIONS

The present application claims priority to German Patent Application No. 102016201276.2, filed on Jan. 28, 2016, and to German Patent Application No. 102016201277.0, filed on Jan. 28, 2016. The entire contents of the above-referenced applications are hereby incorporated by reference in their entirety for all purposes.

FIELD

The present description relates generally to methods and systems for making available and introducing water into the intake manifold of an internal combustion engine.

BACKGROUND/SUMMARY

The operation of internal combustion engines can be optimized by the metered introduction of water into the air/fuel mixture to be burnt. This has basically been known for many decades, and corresponding exemplary embodiments can be found, inter alia, in aircraft from the Second World War or in Oldsmobile passenger cars from the early 60's. In more recent times, economic trials have confirmed the potential of water injection also for direct-injection spark-ignition engines.

In spark-ignition engines, the introduction of water suppresses, in particular, the knocking of the engine. As a result, in particular in charged engines, the power of the engine can be increased and/or its efficiency increased. In spark-ignition engines, the introduction of water into the intake region of the internal combustion engine provides virtually all the advantages available from water injection. In diesel engines, by introducing water into the charge, it is possible, in particular, to reduce the emissions of soot and/or NOx. However, in diesel engines, a more costly direct injection of water into the combustion chamber, separate from the fuel or emulsified with the fuel, is often necessary to achieve all the potential available from water injection.

Hitherto, despite the known advantages, systems for introducing water into the internal combustion engine have not become commonplace in mass production of passenger cars. Reasons for this are, for example, the additional costs, additional mass, and the required installation space for equipping a passenger car with a system for introducing water into the internal combustion engine. The requirements made of customers to provide a further operating medium in the form of a sufficient water supply can also adversely affect customer satisfaction and therefore the economic success of a vehicle manufacturer trying to put onto the market vehicles with systems for introducing water into the engine. However, various systems for introducing water into the internal combustion engine have been described.

U.S. Pat. No. 4,503,813A describes an arrangement for condensing water from the exhaust gas in order to make available water for introduction into the intake section. A description is given of, inter alia, arranging the condensation device above a reservoir container so that the condensed water flows into the reservoir container under gravity.

US20040103859A1 describes an arrangement for introducing water into the intake section. In this arrangement, a water reservoir container is arranged above a water injection nozzle so that the water can flow into the injection nozzle under gravity.

WO2004025108A1 describes a device for introducing liquid additive (cerium salt) into the intake region of a diesel engine.

U.S. Pat. No. 8,375,899B2 describes a fuel system in which, in addition to fuel, water is also introduced into the engine. The water is condensed from the exhaust gas section or the vehicle air-conditioning system and is collected in a separated-off part of the fuel tank. The collected water is introduced into the internal combustion engine by direct injection.

US20110168128A1 describes a system which condenses water from the exhaust gas in an internal combustion engine and feeds it to the engine by direction injection. It is mentioned that depending on the fuel the water can be mixed with the fuel and fed together with it to the engine.

DE102007050511A1 describes a method for precipitating water out of a vehicle air-conditioning system in order to introduce it into an internal combustion engine.

U.S. Pat. No. 8,820,270B2 describes an arrangement for injecting water into the intake region of an internal combustion engine, and a device for precipitating the water from the exhaust gas of the internal combustion engine.

U.S. Pat. No. 4,279,223A describes a device and an arrangement for precipitating water from the exhaust gas of an internal combustion engine. The precipitated water is then fed to a modified vaporizer and in this way finally to the internal combustion engine.

EP2657473A2 describes a device for recovering water from the exhaust gas in an internal combustion engine or from an air-conditioning system. The recovered water is made available to the internal combustion engine using a pump.

US20110138793A1 describes a device for condensing and precipitating water from the exhaust gas of an internal combustion engine. The collected water is fed to the fuel inlet of the internal combustion engine using a pump and is mixed at said inlet with the fuel.

Furthermore, the risk of the water supply freezing requires structural precautions. The previously proposed systems, such as an electric heater, also require further equipment complexity, increased costs, and entail further disadvantages, such as discharging of the vehicle battery or increased fuel consumption for the generation of the required electricity.

U.S. Pat. No. 8,286,615 describes an intake manifold with integral water-cooled charge-air cooler. U.S. Pat. No. 6,619,274 describes a cooled inlet system for outboard motors in V arrangement, wherein the cooled inlet system is arranged in the V of the engine. JPH06123225A also describes a cooled inlet system for an outboard motor. The article "HPA Motorsports 3.2 VR6 Performance Upgrades" describes an intake bridge with integrated charge-air cooler.

However, the inventors herein have recognized potential issues with such systems. As one example, an arrangement for introducing water into the intake region of an internal combustion engine with little structural complexity that prevents the water from being frozen when it is requested for delivery into the inlet region of an internal combustion engine has not been known.

In one example, the issues described above may be addressed by a system comprising: an internal combustion engine having an intake manifold; a throttle valve arranged between an intake manifold inlet and the internal combustion engine; a water inlet connected to the intake manifold downstream of the throttle valve and having a Venturi nozzle which is coupled to a lower region of a first water container positioned above the water inlet; a bypass valve positioned between the intake manifold inlet and the water inlet; and a control mechanism connected to the bypass valve to open it dependent on engine load, causing a pressure drop at the Venturi nozzle that forces water into the intake manifold. In this way, an arrangement for introducing water into the intake region of an internal combustion engine that is cost-effective to manufacture and requires a small installation space is made available. Further, by introducing the water through a Venturi nozzle, a higher water flow and more atomization may be achieved than would be achieved by relying only on gravity feed. Further still, atomized water may enter the combustion chambers directly from the intake manifold and evaporate within the combustion chambers, causing cooling. In some prior approaches, water was injected on the backside of a hot intake valve (port injection) and latent heat of vaporization was lost as some portion of the water evaporated on the intake valve instead of in the combustion chamber. In addition, a pump, pressure lines, and an injector for each combustion chamber were required to inject the water. In other approaches, an injector was placed within each combustion chamber. Such approaches required high pressure pumps, high pressure lines, and an injector in each combustion chamber.

As one example, the first water container may be connected heat-conductively to the intake manifold and may form an integral inlet component. In this way, heat may be transmitted from air flowing through the intake manifold may be transferred to the water in the first water container to prevent the water from being frozen when it is requested for delivery into the intake region of the internal combustion engine. Further, a controller may control actuation of the bypass valve so that water is delivered under select engine operating conditions and not under others. In this way, the arrangement provides for the delivery of water to the intake region of the internal combustion engine in a pumpless manner and without an additional heating element.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
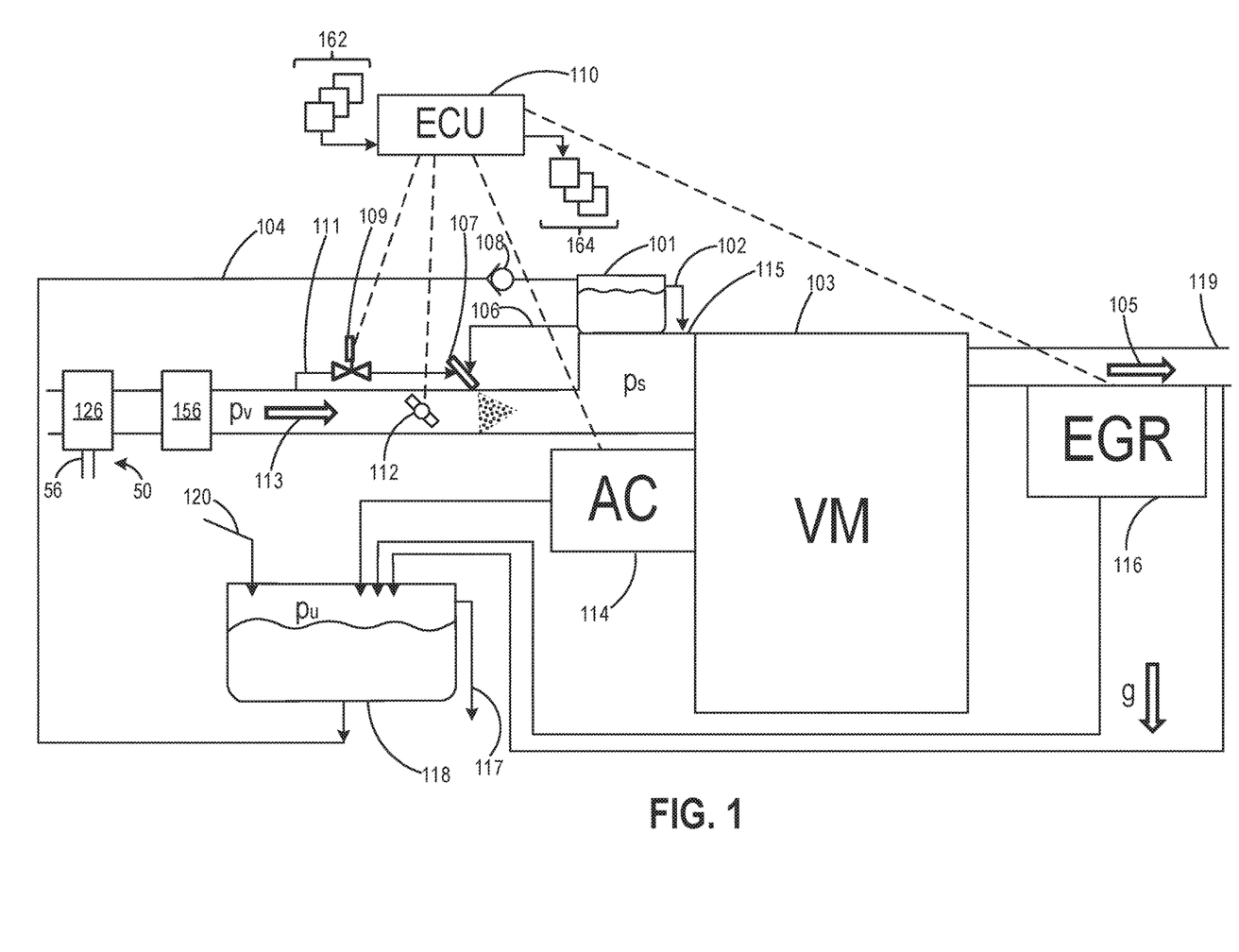
FIG. 1 is a schematic view of an arrangement according to the present disclosure for making available water and introducing it into an internal combustion engine.
Figure 2:
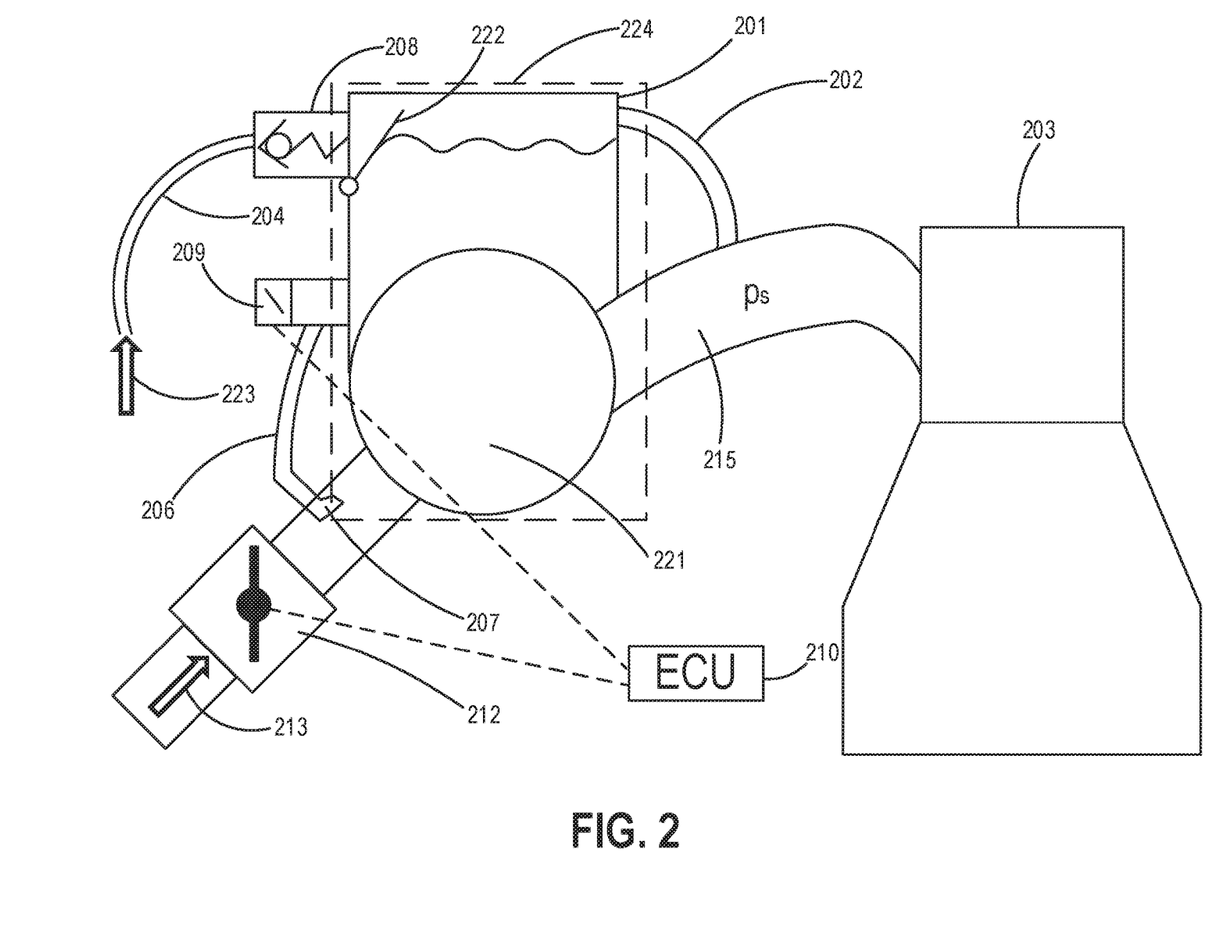
FIG. 2 shows a diagrammatic depiction of an exemplary embodiment of an arrangement for the delivery of water into an inlet region of an internal combustion engine.

The following description relates to arrangements and methods for storing water and delivering it to an intake manifold of an internal combustion engine. In this context, the term "water" is to be understood as also referring to mixtures of water and other substances that are suitable for advantageously influencing the combustion in the internal combustion engine or have other desired properties such as methanol or ethanol. Furthermore, in the following text, the words "intake manifold," "induction manifold," "induction pipe," and "inlet region" are used with the same meaning. As illustrated in FIGS. 1 and 2, the arrangement may comprise a first water container, a water inlet for inputting water into the intake manifold, and a throttle valve that is arranged between an intake manifold inlet and the internal combustion engine. The first water container is arranged at a higher point than the water inlet, and the water inlet opens into the intake manifold downstream of the throttle valve. A lower region of the first water container is fluidically connected to the water inlet, and an upper part of the first water container is fluidically connected to the intake manifold downstream of the throttle valve. In the example embodiment of FIG. 1, a region of the intake manifold is fluidically connected to the water inlet upstream of the throttle valve via a bypass. A switchable valve is arranged in the bypass, with the result that it can interrupt it. In the example embodiment of FIG. 2, a region of the intake manifold is fluidically connected to the water inlet downstream of the throttle valve via a line with the switchable valve arranged therein. In both embodiments, the switchable valve can, depending on position, enable or prevent the flow of water through the water inlet completely or partially. A control device may actuate the switchable valve in order to deliver water to the intake manifold under certain engine operating conditions, for example, according to the method of FIG. 3. In this way, the arrangements according to the present disclosure can be installed in a vehicle in a cost-effective and space-saving fashion in order to permit water to be introduced into the intake region of the internal combustion engine in a pump-less fashion.

In the arrangements according to the present disclosure, the first water container and the intake manifold can be connected in a thermally conductive fashion. In particular, the first water container and the intake manifold can be embodied as one integrated component, as illustrated in more detail in the example embodiment of FIG. 2. For example, the first water container may in particular be connected heat-conductively with at least one plenum chamber and/or at least one inlet duct of the intake manifold, wherein the first water container firstly and the at least one plenum chamber and/or inlet duct secondly may also form an integral inlet component.

Heat may be transmitted from air flowing through the intake manifold to the water present in the water container. In particular with charged engines, the temperature of this air is usually above the ambient temperature. If the temperature of the air still lies below the freezing point of water (e.g., 0° C.) after flowing through a compressor of a charging assembly and any charge-air cooler, usually no water injection into the internal combustion engine is indicated. With the arrangement according to the present disclosure, therefore, it is ensured that the water is not frozen when it is requested for delivery into the intake region of the internal combustion engine.

In an advantageous embodiment of the present disclosure, the arrangement for provision of water for delivery into the intake region of the internal combustion engine comprises a supply line to the at least one water container and a check valve arranged in or on the supply line. A check valve may prevent the water or air from the water container from flowing back into the supply line if a pressure in the water container rises above ambient pressure.

An arrangement according to the present disclosure may also comprise a fill level valve in or on the supply line to the water container. This may prevent so much water flowing through the supply line to the water container that a water level in the water container lies above a threshold value for the water level. The fill level valve may for example be formed as a float valve. It may also be configured as a structural unit with the check valve.

The arrangement according to the present disclosure can also additionally comprise a second water container for collecting water, as illustrated in FIG. 1. The second water container may have, in the upper region, an opening that permits pressure equalization with the surroundings (e.g., atmospheric pressure). In this context, the second water container may be arranged at a lower vertical height than the first water container. A lower region of the second water container may be fluidically connected to an upper region of the first water container via a line, wherein a non-return valve may be arranged in the line in such a way that fluid (e.g., water and/or air) can flow from the second water container to the first water container but not from the first water container to the second water container. The opening of the second water container into the surroundings serves to equalize pressure, since air can flow through it from the surroundings when fluid is fed from the second container. The opening to the surroundings can also be configured here as an overflow through which backing up of precipitated water can be avoided if the second water container has reached a structurally provided setpoint filling level.

The arrangement according to the present disclosure for making water available can also comprise an air-cooling component of an air-conditioning system. In such a case, the component of the air-conditioning system at which air that is intended, for example, for a vehicle cabin is cooled is arranged at a higher point than the second water container. In customary air-conditioning systems, this component for cooling air is a vaporizer. Since the air is cooled at this vaporizer, water condenses out of the air at said vaporizer. So that the condensed water can flow into the second water container under gravity, the vaporizer of the air-conditioning system is arranged above the second water container. Customary vaporizers for air-conditioning systems are configured in such a way that the condensed water is conducted away into the open air through a discharge of a housing under gravity.

In an arrangement according to the present disclosure, the air-cooling component of the air-conditioning system and the second water container are fluidically connected to one another in such a way that water condensed by the air-cooling component can flow into the second water container. It is clear to a person skilled in the art that in the case of unusual air-conditioning designs in which the air is not cooled at a vaporizer, another air-conditioning component at which the air is cooled takes the place of the vaporizer in the arrangement according to the present disclosure.

The arrangement according to the present disclosure for making available water can also comprise a component of an exhaust gas recirculation device (EGR) which is designed to precipitate water. The component of the exhaust gas recirculation device which is designed to precipitate water is then arranged at a higher point than the second water container, since precipitated water is to flow into the second water container under gravity. It is clear to a person skilled in the art that, in particular, a cooler of the exhaust gas recirculation device (EGR cooler) is suitable to be designed to precipitate water. In such a case, the EGR cooler is arranged at a higher point than the second water container, since water from the exhaust gas is condensed in the cooler and is therefore precipitated from the exhaust gas. Such an EGR cooler may also be designed to conduct away the condensed water. If an arrangement according to the present disclosure comprises an exhaust gas recirculation device, the component of the exhaust gas recirculation device which is designed to precipitate water and the second water container are fluidically connected to one another in such a way that water condensed in the component designed to precipitate water can flow into the second water container.

In the arrangement according to the present disclosure for making water available, an exhaust gas section can additionally also be provided which is arranged at a higher point than the second water container, wherein the exhaust gas section and the second water container are fluidically connected to one another in such a way that water condensed in the exhaust gas section can flow into the second water container.

A control device for controlling the arrangement according to the present disclosure is also part of the present disclosure. The control device may be embodied in such a way that it can change the arrangement to a first and a second state. In the first state, the switchable valve is closed, and the pressure in the intake manifold is higher than ambient pressure (charged operating mode). In the embodiment of FIG. 1, in this state, the same pressure occurs in the first water container, in the induction manifold downstream of the throttle valve, and in the water inlet, with the result that water cannot be introduced into the intake manifold from the first water container. In the embodiment of FIG. 2, in this state, the switchable valve being closed blocks the flow of water from the first water container to the water inlet. This state therefore signifies a charged operating mode without the introduction of water.

In the second state, the switchable valve is opened and the pressure in the intake manifold is higher than the ambient pressure (charged operating mode). In this state, water is introduced from the first water container into the intake manifold through the water inlet by means of a combination of gravity and a pressure gradient across the water inlet. This state therefore signifies a charged operating mode with the introduction of water.

The behavior of the arrangement according to the present disclosure for introducing water into the intake manifold in an induction operating mode of the internal combustion engine is similar. In the induction operating mode, as a rule, the introduction of water is not desired. Therefore, in the induction operating mode, the switchable valve can, in particular, be kept closed, with the result that water is not introduced into the intake manifold.

In a further refinement of the control device, said device can also be embodied in such a way that it can change the arrangement to a third state in which the pressure downstream of the throttle valve is lower than the ambient pressure (induction operating mode) and the switchable valve is closed. The pressure from the induction manifold is therefore also set in the first water container and is lower than in the second water container. If the pressure difference is sufficient to overcome gravity, water is conveyed from the second water container into the first water container.

The control device can, depending on the design of the arrangement, be adapted in different ways to the actuation of the respective arrangement. The control device can comprise a different control device or can be integrated into such a device as, for example, an engine control unit.

A vehicle according to the present disclosure comprises an internal combustion engine and an arrangement according to the present disclosure for introducing water into the intake region of an internal combustion engine. The vehicle can additionally comprise a control device for controlling the arrangement. The vehicle may be a passenger car or truck. However, an embodiment as a watercraft (boat or ship), as a rail vehicle, or as a motorbike is also conceivable.

Turning now to the figures, FIG. 1 shows by way of example an arrangement according to the present disclosure for making available and introducing water into an intake manifold 115 of an internal combustion engine 103. The arrangement of this type can be installed, for example, in a vehicle. A first water container 101 is embodied here as an integral component with the intake manifold 115. By virtue of the embodiment as an integral component, heat can be advantageously transmitted to the first water container 101 from the internal combustion engine 103 or intake manifold 115, and therefore the water in the first water container 101 can be prevented from freezing or frozen water can be thawed. A throttle valve 112 is also arranged in the intake manifold 115 downstream of a compressor 126 of a boosting device, such as a turbocharger 50, or a supercharger. Compressor 126 may be at least partially powered by an exhaust turbine (not shown) arranged in an exhaust gas section 119. Compressor 126 may be coupled to the exhaust turbine via a shaft 56. Alternatively, if turbocharger 50 is a supercharger, compressor 126 may be mechanically driven (e.g., belt-driven), electrically driven, or a combination thereof. Compressor 126 may be configured to draw in intake air 113 at atmospheric air pressure and boost it to a higher pressure (e.g., higher than atmospheric pressure). After being compressed by compressor 126, the air may flow through a charge-air cooler 156 for delivery to the internal combustion engine 103 via intake manifold 115. Using the boosted intake air, a charged mode of engine operation may be performed.

Intake air 113 flows through the intake manifold 115 and past the throttle valve 112 into the internal combustion engine 103. Upstream of the throttle valve 112 and downstream of the charge-air cooler 156, the intake air 113 is at a pressure $p_v$. The pressure $p_v$ is frequently also referred to as charge pressure. Downstream of the throttle valve 112, the intake air 113 is at a pressure $p_s$, frequently also referred to as induction pipe pressure. Depending on the setting of the throttle valve 112 and of the mass flow of the intake air 113, $p_s$ is below $p_v$ to a greater or lesser extent. If the internal combustion engine is a charged engine, $p_v$ and $p_s$ can also be above an ambient pressure $p_u$.

A lower region of the first water container 101 is fluidically connected to a water inlet 107 through a first line 106. As a result, water can flow from the first water container 101 to the water inlet 107. An upper region of the first water container 101 is fluidically connected through a second line 102 to a region of the induction manifold 115 downstream of the throttle valve 112. As a result, the pressure $p_s$ is also set in the first water container 101.

The water inlet 107 is arranged downstream of the throttle valve 112 in the induction pipe 115. The water inlet 107 is also arranged underneath the first water container 101, with the result that water flows from the first water container 101 to the water inlet 107 under gravity.

A third line 111 fluidically connects a region of the intake manifold 115 upstream of the throttle valve 112 to the water inlet 107. A bypass valve 109 is arranged in the third line 111. Said bypass valve 109 is of switchable design (e.g., a changeover valve), with the result that it can close or open the third line 111. If the bypass valve 109 is opened, the pressure $p_v$ of the intake air 113 upstream of the throttle valve 112 is present at the water inlet 107, said pressure $p_v$ being above the pressure $p_s$. Through a suitable design of the water inlet 107, this pressure gradient can be used to introduce water from the first water container 101 into the intake manifold 115 through the water inlet 107. For example, water inlet 107 may be a Venturi nozzle such that the air flowing from third line 111 through the nozzle can advantageously create a pressure drop so that water from the first line 106 is pulled into the stream of intake air 113 and delivered into the intake manifold 115. This is a more effective delivery system than relying only on gravity feed. By use of the Venturi nozzle, higher water flow rates are achieved and atomization of the water entering the intake manifold is improved.

Bypass valve 109 is turned on or off by a control device 110 in this example. While bypass valve 109 is in the on state, water is delivered to intake manifold 115 through the Venturi nozzle of water inlet 107 in this example. Control device 110, by controlling bypass valve 109, controls the amount of water delivered in relation to engine operating parameters, such as engine load and temperature, to improve operation of engine 103. For example, water is delivered as described above to achieve one or more of the following engine operating objectives.

One engine operating objective is to avoid ignition knock. Atomized water entering each combustion chamber from the intake manifold evaporates in the high temperature combustion chamber. The change in state of the water cools the combustion chamber. That is, the latent heat of vaporization cools the combustion chamber and accordingly avoids ignition knock. This enables higher compression from compressor 126. With more air delivery to the engine, higher engine torque may be achieved. Likewise, ignition timing may be advanced to achieve higher engine torque.

The water may be introduced through the Venturi nozzle in response to engine operation at higher engine loads. The higher loads may be detected through a determination of mass airflow entering the engine such as by a mass airflow sensor positioned in the intake manifold inlet or from a pressure sensor positioned in the intake manifold and the use of an engine speed density calculation. Water also may be introduced in response to a detection of ignition knock from a knock sensor such as an engine vibration sensor or a pressure sensor coupled to one or more combustion chambers.

Another engine operating objective for the introduction of water to the intake manifold is to prevent pre-ignition when a surface of the combustion chamber may be sufficiently hot to ignite a gasoline fuel before there is an ignition spark from a spark plug. Another engine operating objective is to avoid knock in response to an increased demand for torque such as a sudden change in throttle position. Still other engine operating objectives are to: achieve a desired engine dilution, including the best combination of dilutants such as water and recirculated exhaust gases; reduce emission of nitrogen oxides; or reduce residual gases left in an engine combustion chamber after combustion.

In the illustrated example, a control device 110 is embodied in such a way that it is integrated into an engine control unit (ECU). For example, control device 110 may be a microcomputer comprising a microprocessor unit, input/output ports, an electronic storage medium for executable programs and calibration values (e.g., a read-only memory chip), random access memory, keep alive memory, and a data bus. Control device 110 is shown receiving information from a plurality of sensors 162 and sending control signals to a plurality of actuators 164. As one example, sensors 162 may include exhaust gas sensors, engine speed sensors, and various temperature and/or pressure sensors coupled to various locations throughout the vehicle. As another example, actuators 164 may include fuel injectors, throttle valve 112, compressor 126, etc. The control device 110 may receive input data from the various sensors, process the input data, and trigger the actuators in response to the processed input data based on instruction or code programmed therein corresponding to one or more routines. The control device 110 can therefore actuate the bypass valve 109, the throttle valve 112, an exhaust gas recirculation system 116, turbocharger 50, and also a vehicle air-conditioning system 114. The integration of the control device 110 into the engine control unit promotes introduction of water into the intake manifold 115 in accordance with vehicle requirements, since the engine control unit determines variables which are relevant for the introduction of water, such as $p_v$ and $p_s$. As a result of actuation of the bypass valve 109, the control device 110 can bring about the introduction of water into the intake manifold 115 if, for example, higher charge pressure $p_v$ or induction pipe pressure $p_s$, high engine load, or high temperatures of the intake air 113 are present, as described further with respect to FIG. 3.

The illustrated arrangement comprises further components which serve to make water available for introduction into the intake manifold 115. The exhaust gas recirculation system 116 is arranged in an outlet section of the internal combustion engine 103. An EGR cooler of the EGR system 116 is arranged above a second water container 118. The exhaust gas recirculation system 116 conducts, in a known fashion, a portion of an exhaust gas 105 from the exhaust gas section 119, cools this portion in the EGR cooler, and conducts it into the intake manifold 115 (lines of the exhaust gas recirculation system 116 are not illustrated). During the cooling of the portion of the exhaust gas 105, a quantity of water may condense in the EGR cooler. The EGR cooler of the exhaust gas recirculation system 116 and the second water container 118 are fluidically connected by a line through which the condensed water may flow from the EGR cooler of the exhaust gas recirculation system 116 into the second water container 118 under gravity. Water is therefore fed to the second water container 118 during the operation of the internal combustion engine 103. Correspondingly, water which condenses in the exhaust gas section 119 can also be fed to the water container 118 if, as in the present exemplary embodiment, the exhaust gas section 119 is fluidically connected to the water container 118 via a line or in some other way. The feeding of water from the exhaust gas section 119 can also take place using gravity.

In the illustrated arrangement, a customary vehicle air-conditioning system 114 is also used to make water available. In customary vehicle air-conditioning system 114, water condenses at an air-conditioning system vaporizer. This air-conditioning system vaporizer is correspondingly arranged above the second water container 118. Condensed water can therefore flow into the second water container 118 under gravity.

Furthermore, in the present exemplary embodiment, there is also a filling neck 120 via which water can be fed into the second water container 118 if the vehicle air-conditioning system 114, the EGR cooler of the exhaust gas recirculation system 116, and the exhaust gas section 119 do not supply sufficient water.

An upper region of the second water container 118 is also equipped with an overflow 117. In this way, excess water can flow off when a structurally provided maximum filling level is reached. Additionally, the overflow 117 constitutes an opening to the surroundings, with the result that the ambient pressure $p_u$ can be set in the second water container 118 through the flowing on of air, even if water is extracted from the second water container 118.

A fourth line 104 and a non-return valve 108 serve to feed water from the second water container 118 into the first water container 101. For this purpose, the fourth line 104 is fluidically connected to a lower region of the second water container 118 and the upper region of the first water container 101. The non-return valve is arranged in the fourth line 104 in such a way that a fluid, for example, water or air, can flow from the second water container 118 into the first water container 101, but not vice versa.

If the internal combustion engine 103 is operated in the induction operating mode, the pressure $p_s$ in the intake manifold 115 is below the ambient pressure $p_u$. The pressure $p_s$ is also set in the first water container 101 through the second line 102. Therefore, the pressure in the first water container 101 is also below the ambient pressure $p_u$. The ambient pressure $p_u$ is present in the second water container 118 by virtue of the overflow 117. If $p_s$ is sufficiently far below $p_u$ to overcome the acceleration g due to gravity and counter the difference in height between the first water container 101 and the second water container 118, water may flow from the second water container 118 into the first water container 101. The non-return valve 108 permits fluid to flow in this direction, and water is therefore available in the first water container 101 for introduction into the intake manifold 115.

If the internal combustion engine 103 is operated in the charged operating mode, the pressure $p_s$ in the intake manifold 115 and in the first water container 101 is above the ambient pressure $p_u$. Therefore, the pressure gradient would actually feed fluid from the first water container 101 into the second water container 118 through the fourth line 104. However, this is prevented by the non-return valve 108, which prevents fluid from flowing in this direction. A loss of intake air 113 through the fourth line 104 is therefore prevented.

Overall, the described arrangement makes water available for introduction into the intake manifold 115 of the internal combustion engine 103 and introduces it into the internal combustion engine 103 according to vehicle requirements. Therefore, the advantages of the introduction of water for the engine, such as, for example, a reduction in fuel consumption, can be utilized. By virtue of the arrangement according to the present disclosure, this is possible with advantageously low expenditure on equipment and with low expenditure on maintenance.

FIG. 2 shows diagrammatically a second exemplary embodiment of an arrangement according to the present disclosure for the provision of water for delivery into an inlet region of an internal combustion engine 203. In some examples, the arrangement of FIG. 2 may be included in the arrangement of FIG. 1. As such, like components previously introduced in FIG. 1 are numbered similarly. The arrangement comprises, as well as the internal combustion engine 203, an integral inlet component 224, which is here configured such that it integrates a water container 201 and a plenum chamber 221. The water container 201 in the present exemplary embodiment is arranged above the plenum chamber 221. The integral inlet component 224 in the present exemplary embodiment is configured as an aluminum component. If intake air 213 flowing through the plenum chamber 221 has a higher temperature than the water present in the water container 201, the air transmits heat to the water in the water container 201. Instead of aluminum, the integral inlet component 224 may in principle also be made from another metal or a plastic. If the integral inlet component 224 is made as a plastic part, it may in particular be an injection molding.

The arrangement depicted in the exemplary embodiment of FIG. 2 also comprises a throttle valve 212, an inlet duct 215, a water inlet 207, a changeover valve 209, a fill level valve 222 configured as a float valve and integrated in a check valve 208, a water inlet 207 configured as a Venturi nozzle for the introduction of water into the air flow leading to the internal combustion engine 203, and a control device 210, which is here integrated in an engine control unit.

The throttle valve 212, the plenum chamber 221 of the integral inlet component 224, the inlet duct 215, and the internal combustion engine 203 are arranged such that intake air 213 for combustion of a fuel in the internal combustion engine 203 can flow through these into the internal combustion engine 203. They therefore form part of an air path of the internal combustion engine 203. The check valve 208 is connected to a supply line 204 (e.g., fourth line 104 of FIG. 1) such that water 223 from a source can flow through the check valve 208. For example, the source may be a second water container, such as second water container 118 of FIG. 1. Alternatively, the source may be, for example, an air-conditioning system vaporizer (such as that of vehicle air-conditioning system 114 of FIG. 1), an EGR cooler (such as that of EGR system 116 of FIG. 1), etc. The check valve 208 is furthermore arranged relative to the water container 201 of the integral inlet component 224 such that the water 223 can flow through the check valve into an upper region of the water container 201, but neither air nor water can flow out of the water container 201 through the check valve 208 into the supply line 204.

The fill level valve 222 is configured such that water 223 can flow through the check valve 208 into the water container 201 if a water level in the water container 201 lies below a threshold value. Accordingly, the water 223 can flow out of the source into the water container 201 when the pressure in the water container 201 is lower than in the supply line 204 and the water level in the water container 201 lies below the threshold value.

The water container 201 and the inlet duct 215 are connected together by a first line 202 (e.g., second line 102 of FIG. 1), wherein the end of the line 202 opening into the water container 201 lies above the water surface in the water container 201. The first line 202 constitutes a connection between the water container 201 and the inlet duct 215 that allows the same static pressure $p_s$ to prevail in the water container 201 and in the inlet duct 215. This is helpful in order to be able to deliver water from the water container 201 into the air path of the internal combustion engine 203, at least downstream of the throttle valve 212, without a pump, even in charged operation. In normally aspirated operation of the internal combustion engine 203 (e.g., induction mode), the pressure $p_s$ lies below ambient pressure. In this case, water 223 can usually flow from the source through the check valve 208 into the water container 201.

In the example shown, water can be introduced into the plenum chamber 221. For this, a fluidic connection is present between the water container 201 and the water inlet 207, and comprises a changeover valve 209. In the present exemplary embodiment, the changeover valve 209 is arranged on the lower region of the water container 201 so that water present in the water container 201 can flow into the changeover valve 209 under the effect of gravity. The changeover valve 209 is connected via a second line 206 (e.g., first line 106 of FIG. 1) to the water inlet 207, which opens into the plenum chamber 221. Like the changeover valve 209, the second line 206 is part of the fluidic connection between the water container 201 and the water inlet 207. When the changeover valve 209 is opened, water present in the water container 201 flows under the effect of gravity into the changeover valve 209 and from there through the second line 206 into the water inlet 207. The Venturi effect in the water inlet 207 allows the water to enter the flow of air 213, and thus pass through the plenum chamber 221 and the inlet duct 215 into the internal combustion engine 203. When the changeover valve 209 is closed, accordingly no water reaches the internal combustion engine 203.

The control device 210 controls the changeover valve 209. In the example shown, the control device 210 is integrated in the engine control unit. For example, control device 210 may be a microcomputer comprising a microprocessor unit, input/output ports, an electronic storage medium for executable programs and calibration values (e.g., a read-only memory chip), random access memory, keep alive memory, and a data bus. Control device 210 may receive information from a plurality of sensors (e.g., as described with regard to sensors 162 of FIG. 1) and send control signals to a plurality of actuators, including the changeover valve 209 and the throttle valve 212. The control device 210 may receive input data from the various sensors, process the input data, and trigger the actuators in response to the processed input data based on instruction or code programmed therein corresponding to one or more routines. Thereby, the engine control unit establishes when water is delivered into the internal combustion engine 203. Normally, this is advantageous in charged mode ($p_s$>ambient pressure) and/or at high temperatures of the air 213. If, for example, the internal combustion engine 203 is operated in such a charged mode with high temperatures of the air 213, the control device 210 receives the information that water delivery is requested, as described further below with respect to FIG. 3. Then the control device 210 controls the changeover valve 209 so that it opens. Accordingly, water passes from the water container 201 through the changeover valve 209, the second line 206, and the water inlet 207 into the plenum chamber 221 where it is mixed with air 213 and flows through the inlet duct 215 into the internal combustion engine 203.

If no water injection is desired, the control device 210 controls the changeover valve 209 so that it is closed. Accordingly, no water then flows into the internal combustion engine 203.

In some examples, the control device may not be integrated in the engine control unit, but may be configured as a dedicated control unit, comprise other control devices, or be integrated in other control devices.

The arrangement according to the present disclosure may, depending on the structural design, comprise, for example, a plenum chamber and 4 inlet ducts on a typical 4-cylinder in-line engine. It could, however, merely comprise the plenum chamber or merely the inlet ducts.

Figure 3:
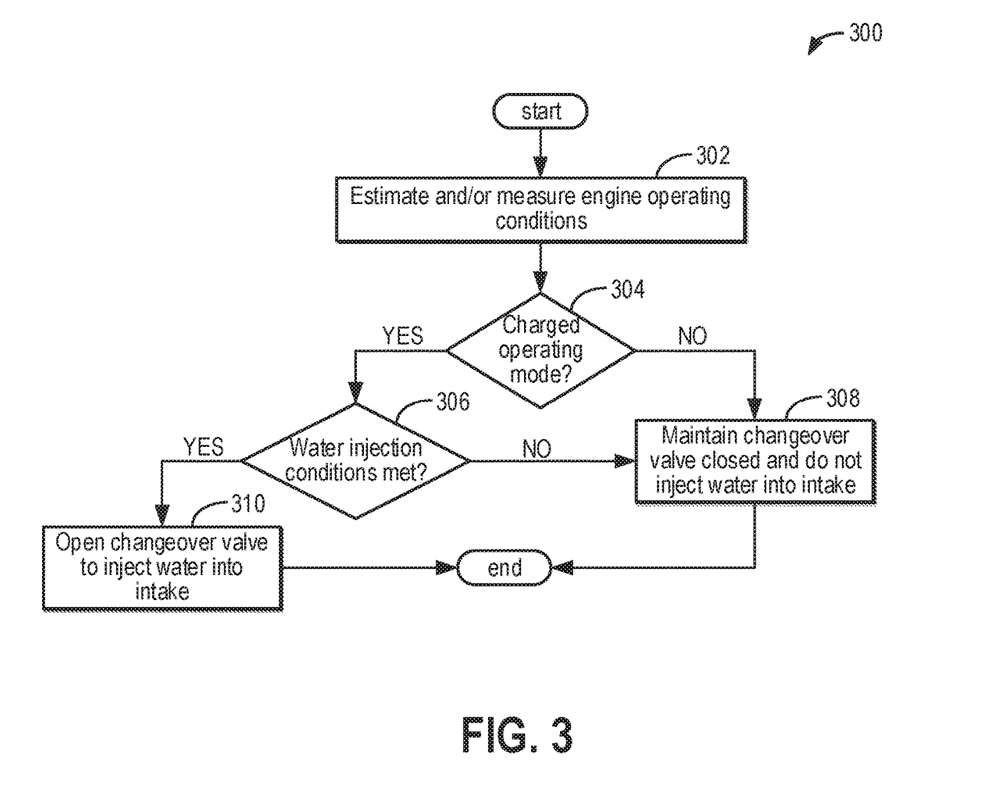
FIG. 3 is a flow chart of an example method for introducing water into an internal combustion engine.

FIG. 3 shows a flow chart of an example method 300 for controlling delivery of water into an intake of an internal combustion engine of an engine system via a water delivery arrangement. Method 300 will be described with reference to the arrangements described and shown in FIGS. 1 and 2, although it should be understood that similar methods may be applied to other systems without departing from the scope of this disclosure. Method 300 may be carried out by a controller, such as control device 110 of FIG. 1 or control device 210 of FIG. 2, and may be stored at the controller as executable instructions in non-transitory memory. Instructions for carrying out method 300 may be executed by the controller based on instructions stored on a memory of the controller and in conjunction with signals received from sensors of the engine system, such as the sensors described above with reference to FIG. 1 (e.g., manifold air pressure and temperature sensors). The controller may employ actuators, such as a switchable valve (e.g., bypass valve 109 of FIG. 1 and changeover valve 209 of FIG. 2) that controls the flow of water from a water container (e.g., first water container 101 of FIG. 1 or water container 201 of FIG. 2) through a water inlet (e.g., water inlet 107 of FIG. 1 or water inlet 207 of FIG. 2), according to the method below.

Method 300 begins at 302 and includes estimating and/or measuring engine operating conditions. Engine operating conditions may include manifold air pressure (MAP), air-fuel ratio, spark timing, fuel injection amount or timing, an EGR rate, mass air flow (MAF), manifold charge temperature (MCT), engine speed and/or load, an engine knock level, etc. Operating conditions may be measured using one or more sensors or estimated based on available data.

At 304, it is determined if the engine is operating under a charged operating mode. For example, operating under the charged operating mode may include an indication of MAP being greater than atmospheric pressure by at least a predetermined threshold amount (e.g., $p_s$ is greater than $p_u$ by at least a threshold amount).

If the engine is not operating in the charged operating mode (e.g., $p_s$ is not greater than $p_u$ by the threshold amount), the engine is operating in an induction operating mode, and method 300 proceeds to 308 and includes maintaining the switchable valve closed and not injecting water into the intake (e.g., intake manifold 115 of FIG. 1 or inlet duct 215 of FIG. 2). With the switchable valve closed, the flow of water from the water container through the water inlet and into the intake is prevented. For example, flow may be prevented due to a lack of a pressure gradient across the water inlet with the switchable valve closed (as described with respect to FIG. 1) or due a physical obstruction of the water flow path by the closed valve (as described with respect to FIG. 2). Following 308, method 300 ends.

Operation of the engine in the induction operating mode with the switchable valve closed represents a third state, as defined above, of the water delivery arrangement. In the third state, water may be conveyed to the water container from a source (e.g., second water container 118 of FIG. 1) located vertically lower than the water container if the pressure difference between the water container and the source is sufficient to overcome gravity.

Returning to 304, if the engine is determined to be operating in the charged operating mode, method 300 proceeds to 306 and includes determining if water injection conditions are met. In one example, water injection conditions may include MCT being greater than a predetermined threshold temperature. Additionally, water injection conditions may include engine speed or load being higher than a threshold. In another example, water injection conditions may include an exhaust gas temperature being above a threshold temperature. As the engine is operating in the charged operating mode, it may be understood that water injection conditions may also include manifold air pressure being greater than atmospheric pressure (e.g., as described at 304).

If water injection conditions are not met, method 300 proceeds to 308 and includes maintaining the switchable valve closed and not injecting water into the intake, as described above. Operation of the engine in the charged operating mode with the switchable valve closed represents a first state, as defined above, of the water delivery arrangement, which signifies a charged operating mode without the introduction of water.

Responsive to water injection conditions being met at 306, method 300 proceeds to 310 and includes opening (e.g., actuating open) the switchable valve to deliver water into the intake. Operation of the engine in the charged operating mode with the switchable valve open represents a second state, as defined above, of the water delivery arrangement, which signifies a charged operating mode with the introduction of water into the intake. With the switchable valve open, the flow of water from the water container through the water inlet and into the intake is enabled. For example, as described with respect to FIG. 1, if the switchable valve is located within a bypass passage fluidically coupling the water inlet to an area of the intake upstream of a throttle valve, opening the switchable valve creates a pressure gradient across the water inlet, which pulls water through the water inlet and into intake air. If the switchable valve is located within the flow path of the water, as described with respect to FIG. 2, opening the switchable valve allows water to flow from the water container, through the switchable valve, and to the water inlet for delivery into the intake air. In each case, the amount of water delivered may be controlled by varying the degree of valve opening, with the amount of water delivered increasing as the degree of valve opening increases. The controller may determine the degree of valve open based on engine operating conditions, such as, for example, MCT, wherein the degree of valve opening increases as MCT increases. For example, the controller may determine the degree of switchable valve opening using a look-up table with the input being the engine operating conditions and the output being the degree of valve opening. As another example, the controller may make a logical determination (e.g., regarding a position of the switchable valve) based on logic rules that are a function of relevant engine operating conditions (e.g., MCT, engine speed/load, MAP, exhaust gas temperature, etc.). The controller may then generate a control signal that is sent to the switchable valve. Following 310, method 300 ends.

In this way, systems and methods are provided for the collection, storage, and introduction of water into an intake manifold of an internal combustion engine of a vehicle. Water may be collected from various systems already present in the vehicle (e.g., an air-conditioning system, an EGR system, an exhaust gas section, etc.), reducing or eliminating manual filling by a vehicle operator, and stored in at least one water container. Further, the water container may be connected heat-conductively to the intake manifold, such as part of an integral inlet component, which may help to thaw frozen water and/or prevent the water from freezing. The introduction of water into the intake manifold may be facilitated by gravity and a pressure gradient across a water inlet, which may include a Venturi nozzle. Further, the flow of water through the water inlet may be controlled by a controller by actuating a switchable valve. Thus, water may be precisely delivered without a water pump. The technical effect of using a switchable valve is that the flow of water for delivery into the engine can be controlled in a pumpless fashion, reducing the cost and complexity of the water delivery arrangement.

As one example, a system is provided, comprising an internal combustion engine having an intake manifold; a throttle valve arranged between an intake manifold inlet and the internal combustion engine; a water inlet connected to the intake manifold downstream of the throttle valve and having a Venturi nozzle which is coupled to a lower region of a first water container positioned above the water inlet; a bypass valve positioned between the intake manifold inlet and the water inlet; and a control device connected to the bypass valve to open it dependent on engine load, causing a pressure drop at the Venturi nozzle that forces water into the intake manifold. In the preceding example, additionally or optionally, the first water container and the intake manifold are connected in a thermally conductive fashion. In any or all of the preceding examples, additionally or optionally, the first water container and the intake manifold are embodied as one integrated component. In any or all of the preceding examples, the system may additionally or optionally comprise a second water container for collecting water that is arranged underneath the first water container, wherein the second water container has: in an upper region, an opening which permits pressure equalization with atmospheric pressure; and a lower region fluidically connected to an upper region of the first water container via a line, wherein a non-return valve is arranged in the line in such a way that fluid can flow from the second water container to the first water container but not from the first water container to the second water container. In any or all of the preceding examples, the system may additionally or optionally comprise an air-conditioning system, wherein an air-cooling component of the air-conditioning system is arranged at a higher point than the second water container; and the air-cooling component of the air-conditioning system and the second water container are fluidically connected to one another in such a way that condensed water can flow from the air-cooling component of the air-conditioning system into the second water container. In any or all of the preceding examples, the system may additionally or optionally comprise an exhaust gas recirculation device, wherein a part of the exhaust gas recirculation device which is designed to precipitate water is arranged at a higher point than the second water container; and the part of the exhaust gas recirculation device which is designed to precipitate water and the second water container are fluidically connected to one another in such a way that water condensed in the part of the exhaust gas recirculation device which is designed to precipitate water can flow into the second water container. In any or all of the preceding examples, the system may additionally or optionally comprise an exhaust gas section which is arranged at a higher point than the second water container, wherein the exhaust gas section and the second water container are fluidically connected to one another in such a way that water condensed in the exhaust gas section can flow into the second water container. In any or all of the preceding examples, additionally or optionally, in a first state, a pressure in the intake manifold is higher than ambient pressure and the control device closes the bypass valve, with the result that water cannot be introduced into the intake manifold from the first water container; and in a second state, the pressure in the intake manifold is higher than ambient pressure and the control device opens the bypass valve, with the result that water from the first water container is introduced into the intake manifold through the water inlet. In any or all of the preceding examples, additionally or optionally, the control device can change the arrangement to a third state in which the pressure downstream of the throttle valve is lower than ambient pressure and the bypass valve is closed, with the result that water is conveyed from the second water container into the first water container.

Another example system comprises a water container and an element of an inlet region of an internal combustion engine, the water container and the element of the inlet region of the internal combustion engine being connected together heat-conductively; a first fluidic connection which connects the water container to the element of the inlet region of the internal combustion engine so as to allow a pressure balancing, and a second fluidic connection which connects the water container to a water inlet arranged at a height below the water container for the introduction of water into an air flow leading to the internal combustion engine, the second fluidic connection containing a change-over valve; and a Venturi nozzle included in the element of the inlet region which is connected to the water container through the first fluidic connection to deliver water to the engine. In the preceding example, additionally or optionally, the element of the inlet region of the internal combustion engine comprises a plenum chamber and/or an inlet duct. In any or all of the preceding examples, additionally or optionally, the water container together with the element of the inlet region of the internal combustion engine forms an integral inlet component, and wherein the integral inlet component is made of metal or plastic. In any or all of the preceding examples, the system may additionally or optionally comprise a supply line to the water container, a check valve arranged in or on the supply line, and a fill level valve arrange in or on the supply line.

As another example, a method is provided, comprising coupling water to a Venturi nozzle of an inlet valve connected to an intake manifold of an engine; routing air from upstream of a throttle positioned in a manifold inlet through a bypass valve to the inlet valve to reduce pressure at the Venturi nozzle, enabling waterflow into the intake manifold; and actuating the bypass valve for a time duration related to an amount of water desired for combustion based on engine operating objectives. In the preceding example, additionally or optionally, the amount of water delivered to the engine through the Venturi nozzle is related to engine load and is determined with the operating objective of preventing engine knock. In any or all of the preceding examples, additionally or optionally, the amount of water delivered to the engine through the Venturi nozzle is determined with the operating objective of preventing pre-ignition in a combustion chamber of the engine. In any or all of the preceding examples, additionally or optionally, the amount of water delivered to the engine through the Venturi nozzle is determined with the operating objective of achieving a desired engine dilution in combination with exhaust gases recirculated back into the intake manifold. In any or all of the preceding examples, additionally or optionally, the amount of water delivered to the engine through the Venturi nozzle is determined with the operating objective of reducing emission of nitrogen oxides. In any or all of the preceding examples, additionally or optionally, the amount of water delivered to the engine through the Venturi nozzle is determined with the operating objective of reducing residual gases left in the engine after combustion. In any or all of the preceding examples, additionally or optionally, the amount of water delivered to the engine through the Venturi nozzle is determined with the operating objective of achieving a desired amount of compressed air delivered to the intake manifold to achieve a desired engine torque.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an internal combustion engine having an intake manifold;
a throttle valve arranged between an intake manifold inlet and the internal combustion engine;
a water inlet connected to the intake manifold downstream of the throttle valve and having a Venturi nozzle which is coupled to a lower region of a first water container positioned above the water inlet;
a bypass valve positioned between the intake manifold inlet and the water inlet; and
a control device connected to the bypass valve to open it dependent on engine load, causing a pressure drop at the Venturi nozzle that forces water into the intake manifold.

2. The system as claimed in claim 1, in which the first water container and the intake manifold are connected in a thermally conductive fashion.

3. The system as claimed in claim 1, in which the first water container and the intake manifold are embodied as one integrated component.

4. The system as claimed in claim 1, further comprising: a second water container for collecting water that is arranged underneath the first water container, wherein the second water container has: in an upper region, an opening which permits pressure equalization with atmospheric pressure; and a lower region fluidically connected to an upper region of the first water container via a line, wherein a non-return valve is arranged in the line so that fluid can flow from the second water container to the first water container but not from the first water container to the second water container.

5. The system as claimed in claim 4, further comprising an air-conditioning system, wherein an air-cooling component of the air-conditioning system is arranged at a higher point than the second water container; and the air-cooling component of the air-conditioning system and the second water container are fluidically connected to one another that condensed water can flow from the air-cooling component of the air-conditioning system into the second water container.

6. The system as claimed in claim 4, further comprising an exhaust gas recirculation device, wherein a part of the exhaust gas recirculation device which is designed to precipitate water is arranged at a higher point than the second water container; and the part of the exhaust gas recirculation device which is designed to precipitate water and the second water container are fluidically connected to one another that water condensed in the part of the exhaust gas recirculation device which is designed to precipitate water can flow into the second water container.

7. The system as claimed in claim 4, further comprising an exhaust gas section which is arranged at a higher point than the second water container, wherein the exhaust gas section and the second water container are fluidically connected to one another that water condensed in the exhaust gas section can flow into the second water container.

8. The system as claimed in claim 1, wherein:
in a first state, a pressure in the intake manifold is higher than ambient pressure and the control device closes the bypass valve, with the result that water cannot be introduced into the intake manifold from the first water container; and
in a second state, the pressure in the intake manifold is higher than ambient pressure and the control device opens the bypass valve, with the result that water from the first water container is introduced into the intake manifold through the water inlet.

9. The control device as claimed in claim 8, wherein the control device can change to a third state in which a pressure downstream of the throttle valve is lower than ambient pressure and the bypass valve is closed, with the result that water is conveyed from the second water container into the first water container.

10. A system comprising: a water container and an element of an inlet region of an internal combustion engine, the water container and the element of the inlet region of the internal combustion engine being connected together heat-conductively; a first fluidic connection which connects the water container to the element of the inlet region of the internal combustion engine so as to allow a pressure balancing, and a second fluidic connection which connects the water container to a water inlet arranged at a height below the water container for introduction of water into an air flow leading to the internal combustion engine, the second fluidic connection containing a changeover valve; and a Venturi nozzle included in the element of the inlet region which is connected to the water container through the second fluidic connection to deliver water to the engine, the Venturi nozzle delivering water between a throttle valve and the internal combustion engine dependent on engine load.

11. The system as claimed in claim 10, wherein the element of the inlet region of the internal combustion engine comprises a plenum chamber and/or an inlet duct.

12. The system as claimed in claim 10, wherein the water container together with the element of the inlet region of the internal combustion engine forms an integral inlet component, and wherein the integral inlet component is made of metal or plastic.

13. The system as claimed in claim 10, which further comprises a supply line to the water container, a check valve arranged in or on the supply line, and a fill level valve arranged in or on the supply line.

14. A method comprising: coupling water to a Venturi nozzle of an inlet valve connected to an intake manifold of an engine downstream of an inlet throttle and upstream of the engine, where water injection via the nozzle is dependent upon engine load; routing air from upstream of a throttle positioned in a manifold inlet through a bypass valve to the inlet valve to reduce pressure at the Venturi nozzle, enabling waterflow into the intake manifold; and actuating the bypass valve for a time duration related to an amount of water desired for combustion based on engine operating objectives.

15. The method of claim 14, wherein the amount of water delivered to the engine through the Venturi nozzle is related to engine load and is determined with the operating objective of preventing engine knock.

16. The method of claim 14, wherein the amount of water delivered to the engine through the Venturi nozzle is determined with the operating objective of preventing pre-ignition in a combustion chamber of the engine.

17. The method of claim 14, wherein the amount of water delivered to the engine through the Venturi nozzle is determined with the operating objective of achieving a desired engine dilution in combination with exhaust gases recirculated back into the intake manifold.

18. The method of claim 14, wherein the amount of water delivered to the engine through the Venturi nozzle is determined with the operating objective of reducing emission of nitrogen oxides.

19. The method of claim 14, wherein the amount of water delivered to the engine through the Venturi nozzle is determined with the operating objective of reducing residual gases left in the engine after combustion.

20. The method of claim 14, wherein the amount of water delivered to the engine through the Venturi nozzle is determined with the operating objective of achieving a desired amount of compressed air delivered to the intake manifold to achieve a desired engine torque.

* * * * *